(12) United States Patent
Wiand

(10) Patent No.: US 8,636,360 B2
(45) Date of Patent: Jan. 28, 2014

(54) BEVELING WHEEL, METHOD FOR FORMING A BEVELED LENS FOR USE WITH EYEGLASSES AND A BEVELED LENS

(76) Inventor: Ronald C. Wiand, Troy, MI (US)

( * ) Notice: Subject to any disclaimer, the term of this patent is extended or adjusted under 35 U.S.C. 154(b) by 786 days.

(21) Appl. No.: 12/540,181

(22) Filed: Aug. 12, 2009

(65) Prior Publication Data

US 2011/0037945 A1   Feb. 17, 2011

(51) Int. Cl.
  *G02C 13/00*   (2006.01)
(52) U.S. Cl.
  USPC ............................................ 351/178
(58) Field of Classification Search
  USPC ............. 351/177, 178, 208, 159.01, 159.73, 351/159.74, 159.75
  See application file for complete search history.

(56) References Cited

U.S. PATENT DOCUMENTS

| | | | |
|---|---|---|---|
| 2,516,549 A * | 7/1950 | Chappell | 351/92 |
| 3,353,303 A | 11/1967 | Stern | |
| 3,824,006 A * | 7/1974 | Voit | 351/106 |
| 4,885,875 A | 12/1989 | Soper | |
| 4,909,679 A | 3/1990 | Berger et al. | |
| 5,384,987 A | 1/1995 | Wiand | |
| 5,410,843 A | 5/1995 | Gottschald | |
| 5,462,568 A | 10/1995 | Donatelli, Jr. | |
| 5,526,068 A * | 6/1996 | Markovitz | 351/44 |
| 5,605,501 A | 2/1997 | Wiand | |
| 5,711,700 A | 1/1998 | Raffaelli | |
| 6,089,963 A | 7/2000 | Wiand et al. | |
| 6,592,220 B1 * | 7/2003 | Cheong | 351/106 |
| 6,758,733 B2 | 7/2004 | Wiand | |
| 6,840,851 B1 | 1/2005 | Raffaelli | |
| 6,899,427 B1 * | 5/2005 | Sheldon | 351/178 |
| 7,281,793 B2 * | 10/2007 | D'Agostino | 351/158 |
| 2005/0213032 A1 * | 9/2005 | Delery et al. | 351/178 |
| 2008/0125013 A1 * | 5/2008 | Schaeffer | 451/5 |
| 2010/0214528 A1 * | 8/2010 | Sheldon | 351/86 |

* cited by examiner

*Primary Examiner* — James Greece
(74) *Attorney, Agent, or Firm* — Brooks Kushman P.C.

(57) ABSTRACT

The present invention relates to a beveling wheel and method for forming a beveled lens with the beveling wheel for use with eyeglasses. One embodiment includes a prescription lens for use on an eyeglass frame having a receiving channel. The receiving channel includes a channel bottom and opposed interior wall surfaces having a first angle therebetween. The prescription plastic lens includes a prescription lens body generally defined by a peripheral edge having a bevel extending away from the edge to a vertex. The bevel has a distal portion with a second angle. The bevel is receivable within the receiving channel. At least a portion of the vertex of the bevel has an interference fit with the receiving channel bottom when held within the eyeglass frame. The first angle is greater than the second angle.

12 Claims, 4 Drawing Sheets

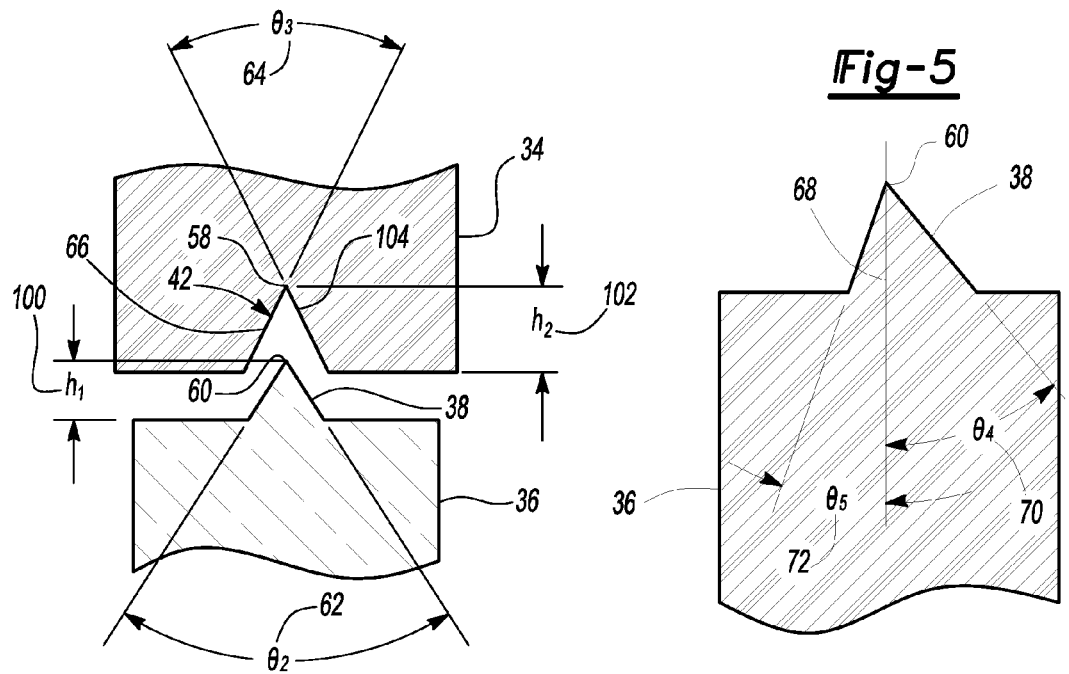
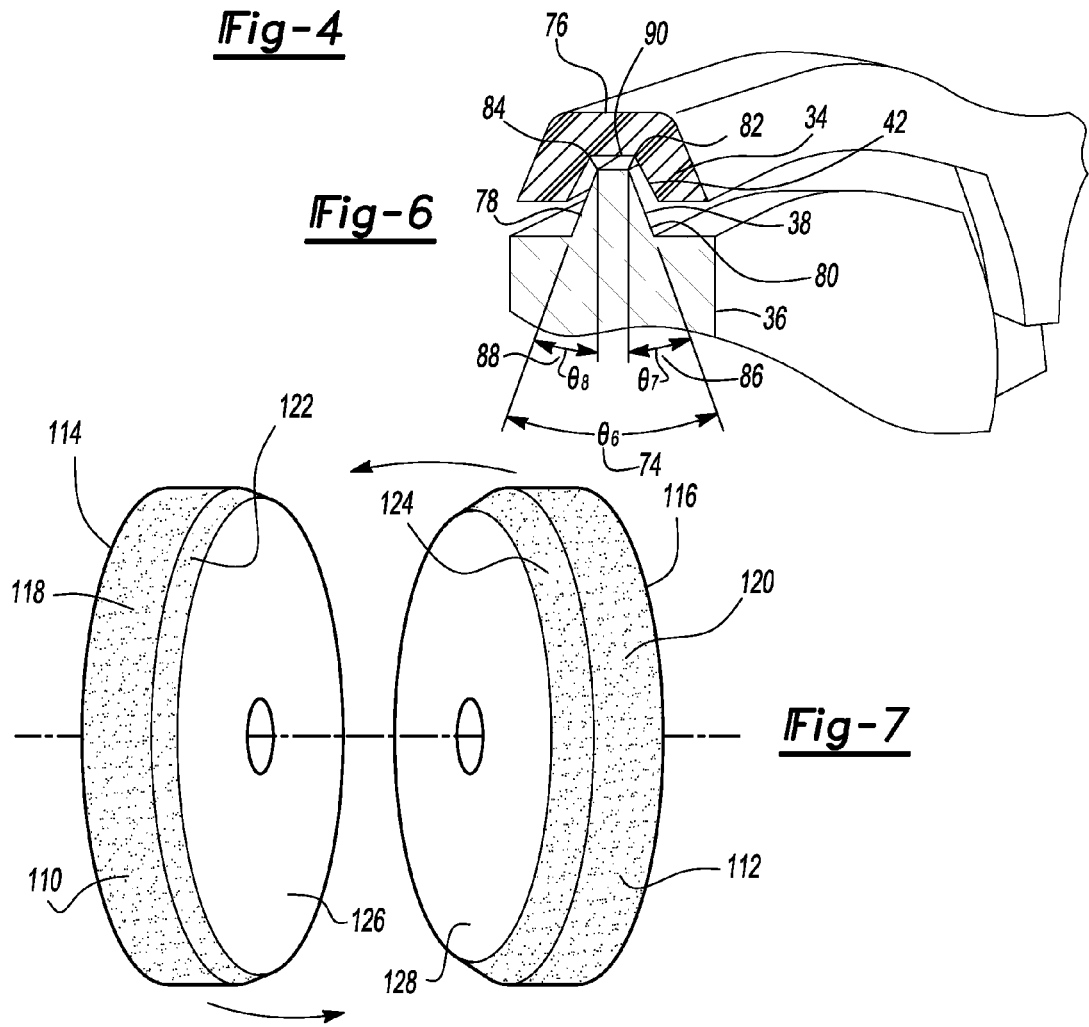

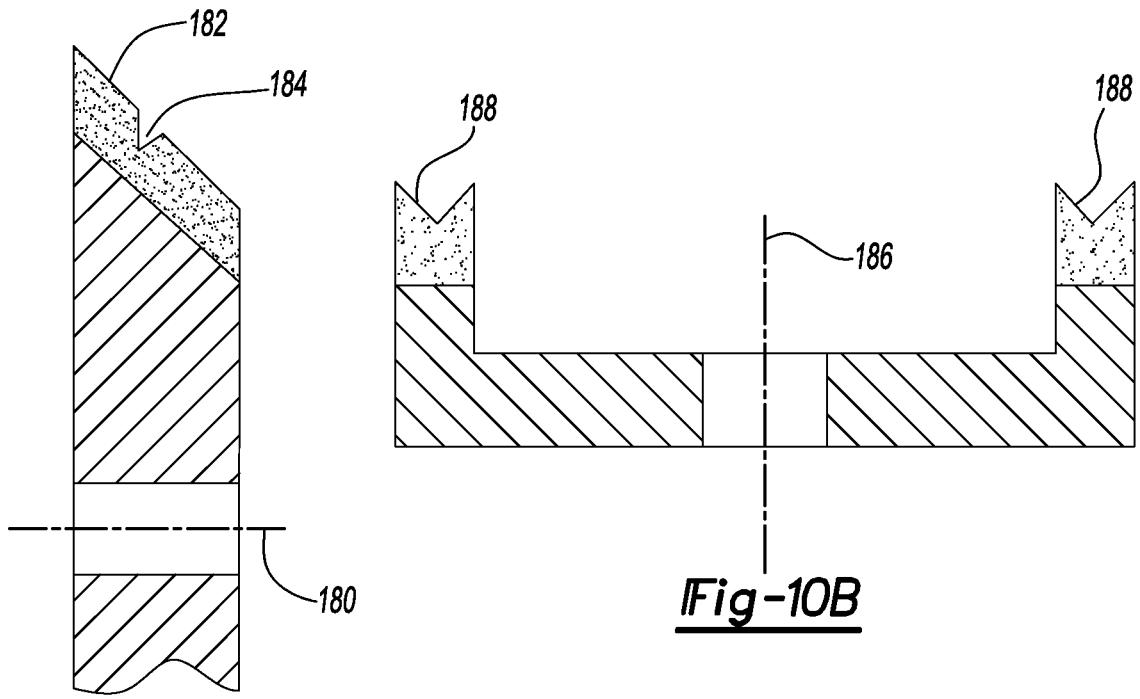
Fig-10A
Fig-10B
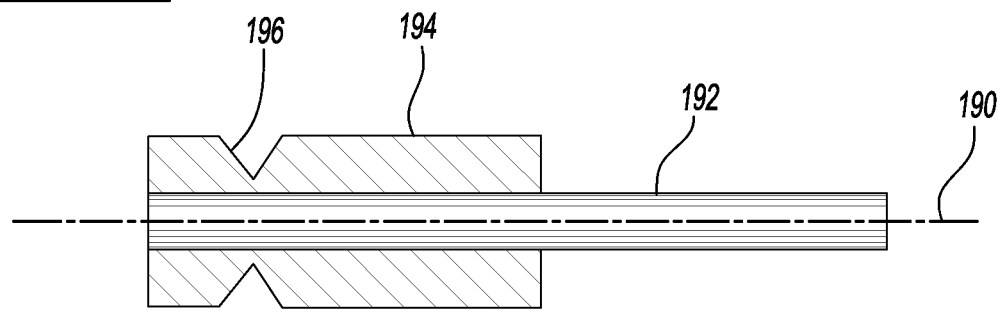
Fig-10C
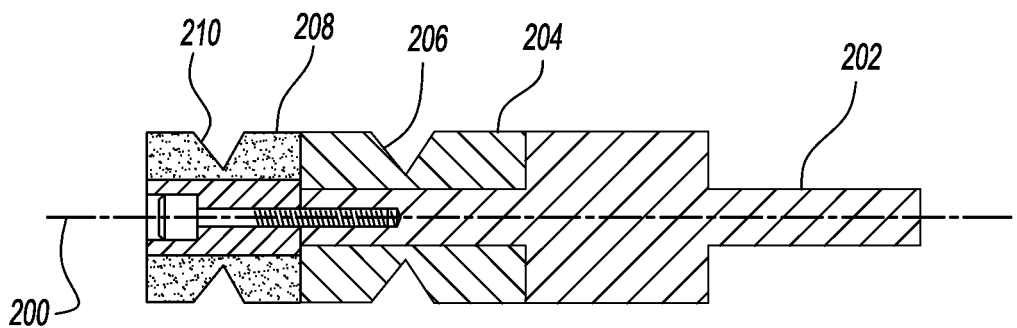
Fig-10D

BEVELING WHEEL, METHOD FOR FORMING A BEVELED LENS FOR USE WITH EYEGLASSES AND A BEVELED LENS

BACKGROUND OF THE INVENTION

1. Field of the Invention

The present invention relates to a beveling wheel, method for forming a beveled lens with the beveling wheel for use with eyeglasses, and a beveled lens.

2. Background Art

Reliable assembly of eyeglasses is crucial to the many wearers of prescription, safety, and/or sun glasses. It is unfortunate that lenses often fall out of eyeglass frames after a period of wearing. In some cases, this is the result of shrinkage and/or creep of a plastic material when used for the lens. Often, an opportunity for falling out is aggravated by the relative thinness of the cross-section of the eyeglass frame, such as an eye-wire frame or a frame only having a partial frame holding for retaining the lens.

Another failure mode occurs when the glass lenses crack as a result of having an interference fit of the vertex of the bevel with a bottom of a channel portion of the eyeglass frame. It is well practiced in the art to avoid cracking of the lens by having the bevel vertex not in contact with the bottom of the channel of the eyeglass frame. As such, glass lenses have always been manufactured to have bevels which will not contact the bottom of the eyeglasses frame.

Diamond beveling wheels are customarily made for use of lens edging equipment that edges the lenses to fit into eyeglass frames. These diamond beveling wheels use technology intended to form the bevel shape required for lenses made of glass. But, today 94% of all eyeglasses are made from plastic lenses using lens edging machines designed to edge plastic lens material.

It is an unfortunate consequence of using beveling wheels designed glass to edge plastic lens materials that the bevel is not fully inserted into the channel of the eyeglass frame. When the plastic lens is not fully inserted, the lens is prevented from forming an optimal interference fit between the lens and the eyeglass frame. As a result, a plastic lens is very susceptible to falling out of the eyeglass frame caused by shrinkage of the lens, loosening of the retention screws or twisting of the frames.

What is needed is a lens that can be assembled into many types of eyeglass frames to yield a more secure assembly of the eyeglass lens and frame that decreases the possibility of the lens falling out.

What is further needed is a beveling wheel which can manufacture a bevel on the lens that can overcome, at least to some degree, the issues of shrinkage, stress and cracking of the lenses.

SUMMARY OF THE INVENTION

One embodiment of the present invention comprises a prescription plastic lens for use in an eyeglass frame. The eyeglass frame has a receiving channel defined by opposed interior wall surfaces having a first angle there between. The receiving channel also has a channel bottom at one end and a channel opening at the other. The prescription plastic lens includes a prescription lens body generally defined by a peripheral edge. The peripheral edge has a bevel extending away from the peripheral edge to a vertex. The bevel has a distal portion having a second angle. The bevel is receivable within the receiving channel. At least a portion of the vertex of the bevel has an interference fit with the receiving channel bottom when held within the eyeglass frame. The first angle is greater than the second angle.

In another embodiment of the present invention, a beveling wheel for use in forming a bevel on a plastic lens for an eyeglass frame is provided. The eyeglass frame has a receiving channel defined by opposed interior walls having a first angle between them at a channel bottom disposed at one end of the receiving channel. The beveling wheel includes an annular disk having a periphery and a central axis. The beveling wheel also includes at least one bevel groove for use in forming the bevel. The bevel groove has a distal end comprising a second angle less than the first angle. When the bevel is retained in the receiving channel of the eyeglass, the vertex of the bevel contacts at least a portion of the channel bottom.

Another embodiment of the present invention includes a method for forming a beveled lens for use with eyeglasses having a lens retention structure including a bottom. The method includes shaping a plastic lens blank generally defined by a first peripheral edge to form a bevel protruding away from a second peripheral edge. The bevel includes a securing structure capable of being in contact with the bottom of the lens retention structure when supported within the lens retention structure.

BRIEF DESCRIPTION OF THE DRAWINGS

FIG. 4 illustrates a cross-sectional view of a beveled lens and a receiving channel of an eyeglass frame according to at least one embodiment of the invention;

FIG. 5 illustrates a fragmentary cross-sectional view of a beveled lens according to at least one embodiment of the invention;

FIG. 6 illustrates a fragmentary perspective view of a bevel and a retention structure of an eyeglass frame according to at least one embodiment of the invention;

FIG. 7 illustrates a perspective view of a beveling wheel according to at least one embodiment of the invention;

FIGS. 10a-10d are fragmentary cross-sectional views of bevel designs for beveling eyeglass lenses.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventor. But, it should be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the operating examples, or where otherwise expressly indicated, all numbers in this description indicating dimensions, angles, material properties, or uses are to be understood as modified by the word "about" in describing the invention's broadest scope. Practice within the numerical limits stated is generally preferred. Figures may not necessarily be to scale. Also, unless expressly stated to the contrary:

- the term "polymer" includes "oligomer," "copolymer," "dimer," "terpolymer," "tetramer" and the like;
- a material group or class described as suitable or preferred for a given purpose in connection with the invention implies any two or more of these materials may be mixed and be equally suitable or preferred;
- an acronym's first definition or other abbreviation applies to all subsequent uses here of the same abbreviation and mutatis mutandis to normal grammatical variations of the initially defined abbreviation; and
- unless expressly stated to the contrary, measurement of a property is determined by the same technique as previously or later referenced for the same property.

An interference fit of a bevel on a plastic lens to a bottom of a receiving channel of an eyeglass frame provides a relatively secure assembly with regard to lenses falling out. The assembly is particularly secure when a bevel height of the bevel on the plastic lens is greater than a depth of a groove of the eyeglass frame by an amount exceeding a typical shrinkage and/or creep dimensional change associated with polymeric materials used in a lens body for a lens. Use of plastic for a lens allows an interference fit between a vertex of the bevel and a receiving channel of the eyeglass frame. Unlike a glass lens, the plastic lens is not readily susceptible to cracking when a vertex of the glass bevel comes in prolonged contact with the receiving channel bottom of the eyeglass frame. The prolonged contact in at least one embodiment may be more than a day. In another embodiment the prolonged contact may be more than a month. In yet another embodiment, the prolonged contact may be more than a year.

Figure 1:
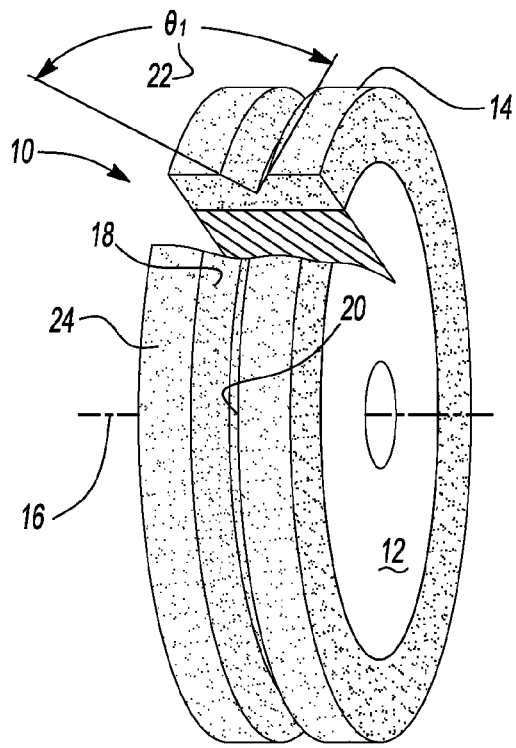
FIG. 1 illustrates a perspective view of a beveling wheel according to at least one embodiment of the invention.

FIG. 1 schematically illustrates a perspective view of a beveling wheel 10 made in accordance with an embodiment of the present invention. The beveling wheel 10 has an annular disk 12 with a periphery 14 and a central axis 16. The beveling wheel 10 includes at least one bevel groove 18 for use in forming a bevel on a plastic lens. The bevel groove 18 has a distal end 20 which has a bevel groove angle 22.

The depth of the bevel groove 18, in at least one embodiment, may range from 0.25 mm to 1.1 mm. In another embodiment, the depth of the bevel groove 10 may range from 0.4 mm to 1 mm. In at least one other embodiment, the depth of the bevel groove 10 may range from 0.45 mm to 0.75 mm. It should be understood that the bevel wheel 10, while illustrated as shown in FIG. 1, may include multiple grooves and grooves of different shapes and positions without exceeding the scope of the present invention. Further, it should be understood that the central axis may include a rotating shaft and/or keyway (not shown), such as a router blade for beveling eyeglass lenses, without exceeding the scope of the present invention.

The bevel groove 18 may be angularly shaped such as a V-groove. The angle 22, $\theta_1$, of the bevel groove 18, may have an angle ranging from 100° to 130° at the distal end 20, such as an apex of the V. In another embodiment, the angle of the bevel groove 22 may range from 105° to 120°. In yet another embodiment, the angle of the bevel groove 22 may range from 108° to 118°. The periphery 14 of the beveling wheel 10 may have an abrasive surface 24, such as tungsten carbide or polycrystalline diamond. The abrasive surface 24 may also line the bevel groove 18. It should be understood that the abrasive surface 24 of the periphery 14 may employ the same or different abrasive from the abrasive surface in the bevel groove 18 without exceeding the scope of the invention. The abrasive surface 24 is capable of shaping a plastic lens body.

Figure 2:
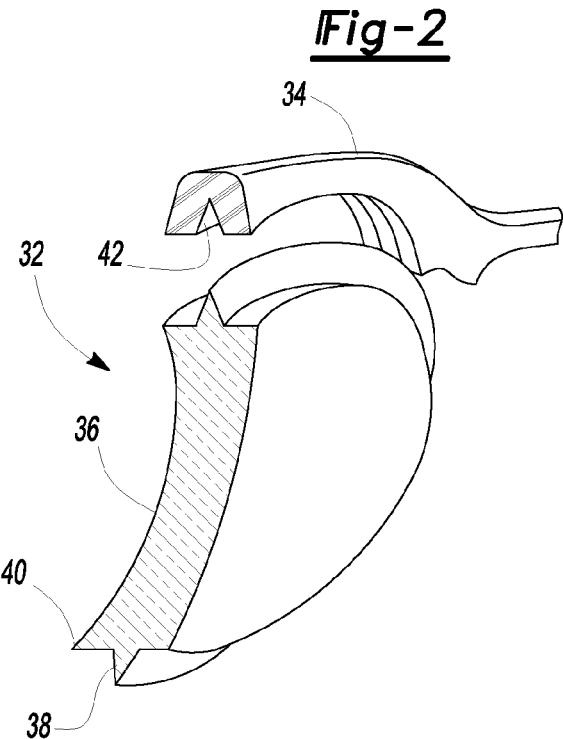
FIG. 2 illustrates a fragmentary perspective view of an eyeglass assembly according to at least one embodiment of the invention.

FIG. 2 schematically illustrates a fragmentary perspective view of an eyeglass component 32 made in accordance with an embodiment of the present invention. The eyeglass component 32 includes an eyeglass frame 34 and a lens body, such as a lens 36 that, when assembled, is supported by the eyeglass frame 34. The lens 36 includes a bevel 38. In at least one embodiment, the bevel 38 may be formed by a beveling wheel, such as beveling wheel 10. The bevel 38 is positioned on the periphery 40 of the lens 36. The bevel 38 cooperates with a retention structure 42 on eyeglass frame 34 to provide an interference fit with the bevel 38 when assembled together. It should be understood that while the bevel 38 and the retention structure 42 are illustrated as being triangular, the shape of the bevel 38 and the retention structure 42 may include any polygonal shapes, provided that bevel 38 may achieve an interference fit with retention structure 42, without exceeding the scope of the present invention.

Figure 3A:
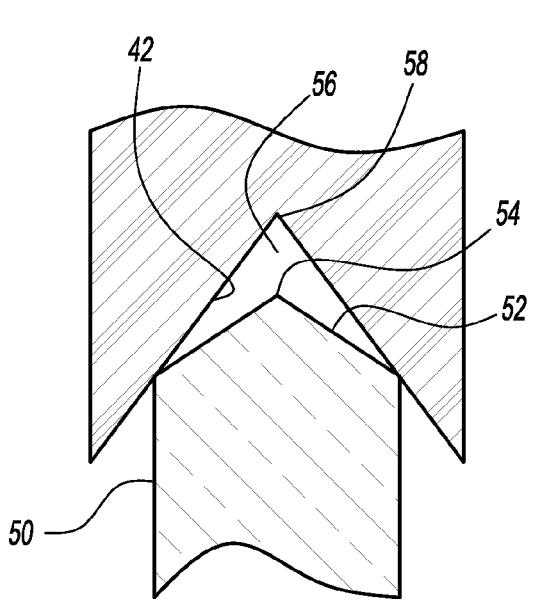
FIG. 3a illustrates a fragmentary cross-sectional view of a beveled lens and receiving channel of an eyeglass frame according to the prior art.

Turning now to FIG. 3a, a cross-sectional view of the prior art fit between a prior art bevel 50 and a retention structure, such as retention structure 42, is schematically illustrated. The sides 52 of the prior art bevel 50 leading to the vertex 54 of the prior art bevel define a gap 56 in cooperation with the retention structure 42. The gap 56 includes the space between the vertex 54 of the prior art bevel 50 and vertex 58 of the retention structure 42. This gap 58 was necessary with prior art glass bevel 50 to avoid fracturing the ceramic pointed vertex, such as vertex 54 of the prior art bevel, that could occur when the vertex 54 came in contact with the vertex 58 of retention structure 42.

When bevel 50 is glass and contacts the retention structure 42, the prior art bevel 50 may crack. When bevel 50 is a thermoplastic composition, such as when bevel 50 is a polycarbonate material, compression on the apex of the bevel tends to lessen the chance of stress on the lens as the softer bevel easily deforms, absorbing the pressures that would have created stress in a lens that was fitted into a frame such as an eyewire. The eyewire, as commonly known in the art, typically uses larger lens bevel designs, which contact larger areas of the non-deformable cross-section. When bevel 50 is a thermoset plastic composition, such as CR-39 by PPG, the thermoset material generally shrinks with age as a crosslinking process used in manufacturing the thermoset material continues. The thermoset bevel can tolerate moderate stress when the bevel 50 is initially compressed in the eyewire frame. Birefringence rings may be evident in the plastic lens within 10 mm of the bevel 50. As shrinkage occurs, the stress is relieved, but using the embodiments of the invention, the lens remains secure in the eyewire frame, but the birefringence may diminish in intensity and size.

Figure 3B:
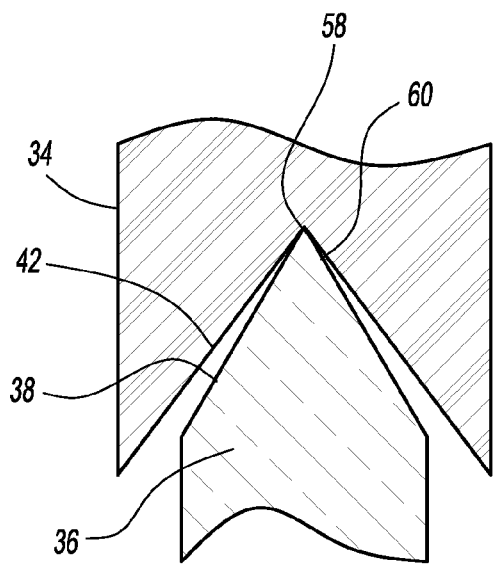
FIG. 3b illustrates a cross-sectional view of the bevel in an interference fit with an eyeglass frame receiving channel bottom according to at least one embodiment of the invention.

FIG. 3b schematically illustrates a fragmentary cross-sectional view of retention structure 42 with the bevel 38 made in accordance with at least one embodiment. The bevel 38 has a securing structure, including the vertex 60 of the bevel, in contact with the retention structure's vertex 58. The contact may be an interference fit It should be understood that while bevel 38 is shown as contacting retention structure 42 at the point of interference fit, the bevel 38 may additionally contact the retention structure 42 at numerous other points, or continuously, along the sides of the angles without exceeding the scope of the invention. Further, it should be understood that the bevel 38 may be connected to the vertex 58 of the retention structure with a bedding material without exceeding the scope of the invention. In addition, it should be understood that the bevel 38 may be intermittently present, such as being present on selected portions of the periphery 40. For example, bevel 38 may be present on a portion of the lens body periphery 40 when the lens body is used with eyeglass frames having only frame portions corresponding to an upper half of the lens body. As another example, spaces may extend between adjacent portions of the bevel 38, such that one continuous bevel does not necessarily extend around the entire periphery 40 of the lens 36.

FIG. 4 illustrates a fragmentary cross-sectional view of the bevel 38 and the retention structure 42. The bevel 38 on lens 36 has an angle 62, $\theta_2$, defined, in general, by the angle associated with the sides of the bevel adjacent to the bevel's vertex 60 of the bevel 38. Retention structure 42 has an angle 64, $\theta_3$, which is generally defined by sides 66 of the retention structure 42 adjacent to the retention structure's vertex 58.

In at least one embodiment, the plastic bevel 38 is substantially free of a crazing zone, including whitening or birefringence band, within 10 mm of the vertex 60 of the bevel, when held within the eyeglass frame 34. In other embodiments, the plastic bevel 38 is substantially of the crazing zone or birefringence band within 5 mm of the vertex 60 of the bevel, when held within the eyeglass frame 34.

The bevel angle 62, $\theta_2$, may be less than the angle of retention structure angle 64, $\theta_3$, in order to assure that the bevel's vertex 60 can come in contact with retention structure's vertex 58 to form the interference fit when the lens 36 is assembled with the eyeglass frame 34. In at least one embodiment, the bevel angle 62 may range from 100° to 130°. In another embodiment, the bevel angle 62 may range from 105° to 120°. In yet another embodiment, the bevel angle 62 may range from 108° to 118°.

It should be understood that the bevel 38 of lens 36 may not necessarily be an isosceles triangle as schematically illustrated in FIG. 4, rather it may be shaped otherwise, such a scalene triangle as schematically illustrated in FIG. 5. When the bevel 38 is the scalene triangle shape, the angles of the sides may be determined by measurement from a vertical transect 68 passing through the bevel's vertex 60. The result is having two different angles representing the bevel angle 62 such that the bevel angle 62 is subdivided into an outboard angle 70, $\theta_4$, which is positioned on the side of the eyeglasses away from a wearer relative to an inboard angle 72, $\theta_5$. The outboard angle 70 defines a first slope which may range from 45° to 65° in at least one embodiment. In another embodiment, the outboard angle may range from 50° to 62°. In yet another embodiment, the outboard angle 70 may range from 55° to 60°. The inboard angle 72 is less than the outboard angle 70 in at least one embodiment and defines a slope ranging from 46° to 65°. In another embodiment, the slope of the inboard angle 72 ranges from 51° to 61°. In yet another embodiment, the slope of the inboard angle 72 ranges from 55° to 60°.

Referring now to FIG. 6, a perspective cross-sectional view of an eyeglass component assembly is schematically illustrated. Lens 36 includes the bevel 38 shaped as a frustum. The angle of bevel 38 is defined as $\theta_6$ 74 which is defined by sides 78 and 80 of the frustum and a virtual vertex 76 positioned above a plane of a truncation of the frustum. The frustum has at least two vertices 82 and 84. Vertical transects 86 and 88 pass through vertices 82 and 84, respectively, and are transverse to the plane connecting the two vertices. Extensions of the side 80 and vertical transect 86 define a slope $\theta_7$ that may range from 45° to 65° in at least one embodiment of the invention. In another embodiment of the invention, the slope $\theta_7$ may range from 50° to 62°. In yet another embodiment of the invention, the slope $\theta_7$ may range from 55° to 60°. The extension of side 78 and vertical transect 88 define another slope $\theta_8$. The slope $\theta_8$, in at least one embodiment, may range from 45° to 65°. In another embodiment, the slope $\theta_8$ may range from 50° to 62°. In yet another embodiment, the slope $\theta_8$ may range from 55° to 60°.

One or more of the vertices 82 or 84 may contact a bottom 90 of the retention structure 42. It should be understood that a connecting material may be between either of the vertices 82 or 84 and the bottom 90 without exceeding the scope of the invention.

It should be understood that while a right frustum is illustrated in FIG. 6, other shapes of the bevel may be used without exceeding the intent of the invention. Examples of frustum-like shapes include, but are not limited to, an oblique frustum, a frustum having chamfered and/or splined sections between vertices 82 and 84, a frustum having radiused sections between vertices 82 and 84, and combinations thereof. It should also be understood that a truncated bevel, such as the frustum, may have n-gon faces, where n is two or more, and have two or more vertices without exceeding the scope of the invention.

Further, it should be understood that the bevel 38 may have almost any shape provided that there are no undercuts to the bevel 38. A two-dimensional cross-sectional view of the bevel 38 has one axis of symmetry or less in at least one embodiment.

Referring back to FIG. 4, the bevel 38 has a height 100, $h_1$, may be greater than 0.25 mm in at least one embodiment. In another embodiment, the height 100, $h_1$, of bevel 38 may range from 0.25 mm to 1.1 mm. In another embodiment, the height 100, $h_1$, of the bevel 38 may range from 0.28 mm to 1 mm. In at least another embodiment, the height 100, $h_1$, of the bevel 38 may range from 0.30 mm to 0.75 mm.

A receiving channel 104 of the retention structure 42 has a height 102, $h_2$, may be less than the height 100, $h_1$, of bevel 38 in at least one embodiment of the invention. In another embodiment, the height 102, $h_2$, of the receiving channel 104 of the retention structure may be greater than 0.24 mm. In at least one other embodiment, the height 102, $h_2$, of the receiving channel 104 of the retention structure 42 may range from 0.24 mm to 1.09 mm. In at least another embodiment, the height 102, $h_2$, of receiving channel 104 of retention structure 42 may range between 0.34 mm to 0.99 mm. In yet another embodiment of the invention, the height 102, $h_2$, of the receiving channel 104 of the retention structure 42 may range from 0.44 mm to 0.74 mm.

A prescription lens body for use in preparing the lens 36, onto which bevel 38 is disposed, may be composed of any plastic used for prescription lenses. Non-limiting examples of plastic for the prescription lens body may include a crosslinked homopolymeric allylic molecule, a polymer copolymeric system including at least one allylic molecule, a polycarbonate-containing polymer, a selectively crosslinked urethane-based polymer, and a polymer having a refractive index ranging from 1.56 to 1.7. An example of the homopolymeric allylic molecule includes allyldiglycolcarbonate such as PPG CR-39 thermoset. An example of a selectively crosslinked urethane-based polymer includes a quasi-thermosetting polymer, such as Trivex provided by PPG. In another embodiment, the polymer may have a refractive index ranging from 1.6 to 1.7. In yet another embodiment, the polymer may have a refractive index ranging from 1.67 to 1.7.

The lens body may be formed using a plastic shaping process including abrading, casting in a mold, milling, injection molding, adhering, using material additive methods, such as stereolithography, and combinations thereof.

It should be understood that the bevel 38 may also be formed on a lens body using a plastic shaping process, including abrading, casting in a mold, milling, injection molding, adhering, using material additive methods, such as stereolithography, and combinations thereof. It should be further understood that the plastic shaping processes may yield net shape bevels, near net shape bevels, and/or bevels requiring use of a secondary process, such as a machining process with the beveling wheel of at least one embodiment of the present invention.

FIG. 7 schematically illustrates a perspective view of a beveling wheel having at least two beveling wheel portions 110 and 112. Each beveling wheel portion 110 and 112 has a periphery 114 and 116, respectively. On each periphery 114 and 116 is an abrasive surface 118 and 120, respectively. Each periphery 114 and 116 has an inwardly directed angled surface 122 and 124, respectively, which is also abrasive.

The beveling wheel portions 110 and 112 may be joined together along the annular disk faces 126 and 128 to define a bevel groove comprised of the inwardly directed angled surfaces 122 and 124.

A bevel groove angle such as the bevel groove defined by the inwardly directed angled surfaces 122 and 124 may range from 100° to 130° in at least one embodiment of the invention. In another embodiment of the invention, the bevel groove angle may range from 105° to 120°. In another embodiment of the invention, the bevel groove may range from 108° to 118°. It is understood that while the bevel wheel is illustrated as having only two portions, bevel wheels may be constructed with a plurality of portions including some that are only portions of the inwardly directed angled surfaces 122 and 124 without exceeding the scope of the invention.

Figure 8A:
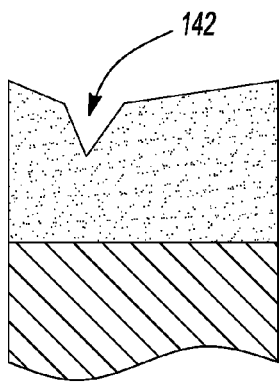
FIGS. 8a-8c illustrate fragmentary cross-sectional views of beveling wheel peripheries having bevel grooves according to at least one embodiment of the invention.
Figure 8B:
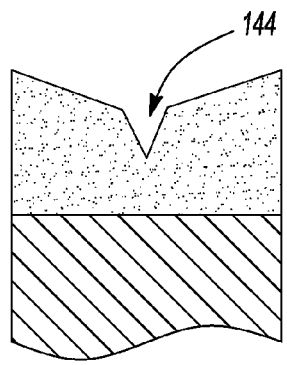
Figure 8C:
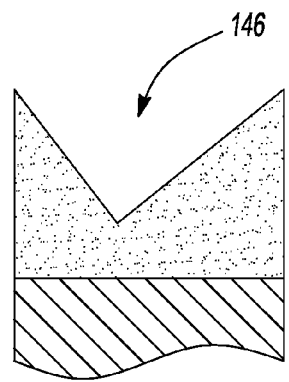

Turning now to FIGS. 8a-8c, some exemplary fragmentary cross-sections of bevel wheels and bevel grooves are schematically illustrated. Non-limiting examples of bevel grooves include a hidden bevel 142, as shown in FIG. 8a, a double V-groove bevel 144 illustrated in FIG. 8b, and a V-bevel illustrated in FIG. 8c. All of these bevels 142, 144, and 146 may be used in certain embodiments of the present invention.

Figure 9A:
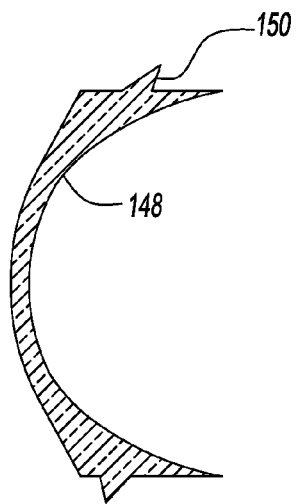
FIGS. 9a-9f illustrate cross-sectional views of lenses having bevels according to at least one embodiment of the invention.
Figure 9B:
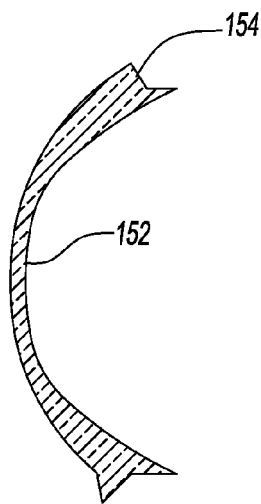
Figure 9C:
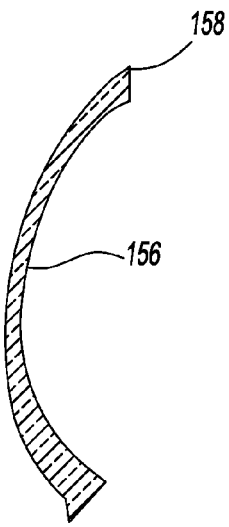
Figure 9D:
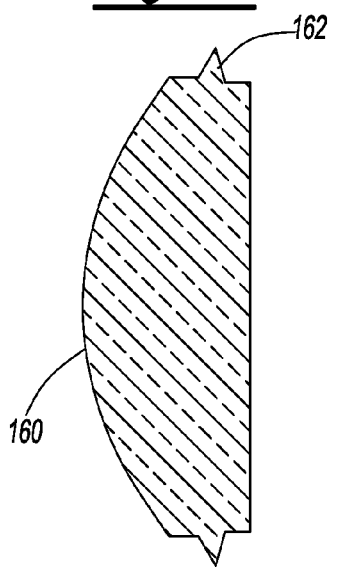
Figure 9E:
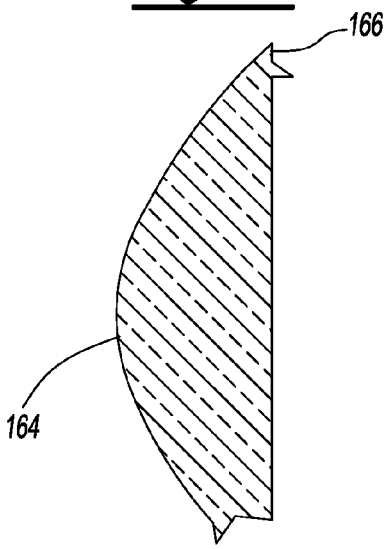
Figure 9F:
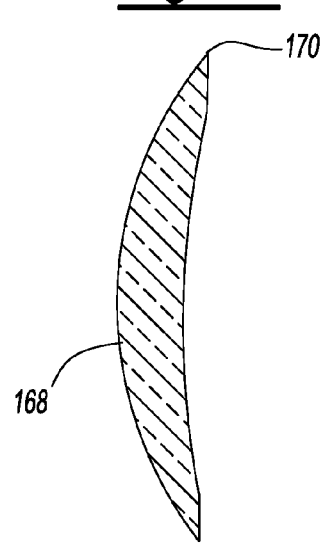

FIGS. 9a-9f schematically illustrate exemplary bevels on lenses according to embodiments of the present invention. FIG. 9a illustrates a relatively high minus optical power lens 148 with a hidden bevel 150. FIG. 9b illustrates a medium power minus optical lens 152 with a hidden bevel 154. FIG. 9c illustrates a relatively lower minus optical power lens 156 with a V-bevel 158. FIG. 9d illustrates a relatively high power plus lens 160 with a hidden bevel 162. FIG. 9e illustrates a medium power plus optical lens 164 with a hidden bevel 166. FIG. 9f illustrates a relatively low power plus optical lens 168 with a V-bevel 170.

Turning now to FIGS. 10a-10d, additional embodiments of beveling wheels suitable for producing the bevel 38 are schematically illustrated. In FIG. 10a, the beveling wheel has the central axis 180 and an oblique abrasive periphery 182. In the oblique abrasive periphery 182 is a beveling groove 184. It is understood that the beveling groove 184 may or may not have portions that are inwardly directed toward the central axis 180. But the overall direction of the bevel groove 184 can be inwardly directed in general relative to central axis 180.

In FIG. 10b, the central axis 186 is disposed to allow beveling groove portions 188 to rotate about the central axis 186.

FIG. 10c illustrates a cross-section of a beveling wheel wherein a central axis 190 is filled with a rotatable shaft 192. The rotatable shaft is connected to an abrasive surface 194 into which a bevel groove 196 is disposed.

In FIG. 10d, a central axis 200 is filled with a rotatable shaft 202 which supports a first abrasive surface 204 into which a first bevel groove 206 is cut. The rotatable shaft 202 further supports a second abrasive surface 208 into which a second bevel groove 210 is cut. It is understood that abrasive surface 204 may have a different composition than abrasive surface 208 without exceeding the scope of the present invention. It should be further understood that while FIG. 10d illustrates a beveling wheel with two different abrasive surfaces 204, 208 and two different beveling grooves 206 and 210, in other embodiments, a plurality of abrasive surfaces and bevel grooves may be combined without exceeding the scope of the invention.

Abrasive surfaces, such as surfaces 24, 204, and/or 208, in at least one embodiment, may have compositions of materials having hardness ranging from 4 to 10 on the Moh's hardness scale. In another embodiment, abrasive surfaces may have compositions of materials having a hardness greater than 9.

It is also understood that in at least one embodiment, the abrasive surface may include a portion of a cutting media may be partially in a grinding matrix without departing from the scope of the invention. In another embodiment, the cutting media may fully encapsulated in the grinding matrix.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A prescription plastic lens for use in an eyeglass frame, said eyeglass frame having a receiving channel defined by opposed interior wall surfaces having a first angle therebetween, the receiving channel having a channel bottom at one end and a channel opening at the other end, the plastic lens comprising:
    a prescription lens body generally defined by a peripheral edge, the peripheral edge having a bevel extending away from the peripheral edge to a vertex, the bevel having a distal portion having a second angle defined between opposing sides of the bevel adjacent to the vertex, the bevel being receivable within the receiving channel, at least a portion of the vertex of the bevel being in contact with the receiving channel bottom and having an interference fit with the receiving channel bottom when held within the eyeglass frame, the first angle being greater than the second angle;
    wherein the portion of the vertex in contact with the receiving channel bottom is in compression once the plastic lens is fitted in the frame.

2. The lens of claim 1, wherein the height of the bevel ranges from 0.25 mm to 1.1 mm.

3. The lens of claim 1, wherein the bevel is a triangle having an apex.

4. The lens of claim 3, wherein the apex has an angle in the range from 100 degrees to 130 degrees.

5. The lens of claim 3, wherein the apex has an angle in the range from 105 degrees to 120 degrees.

6. The lens of claim 3, wherein the height of the triangle ranges from 0.25 mm to 1.1 mm.

7. An eyeglasses component comprising:
    an eye-wire eyeglass frame, and two lenses supported by the eye-wire eyeglass frame, each of the lenses being a lens according to claim 1.

8. The lens of claim 1, wherein the bevel is intermittently present.

9. The lens of claim 1, the second angle having a vertical transect and having at least a first slope ranging from 45 degrees to 65 degrees and a second slope ranging from 55 degrees to 60 degrees.

10. The lens of claim 9, the lens wherein the first slope and the second slope, when combined, are less than the first angle.

11. A prescription plastic lens for use in an eyeglass frame, said eyeglass frame having a receiving channel, the lens comprising:

a prescription plastic lens body generally defined by a peripheral edge having a bevel extending away from the peripheral edge to a vertex, the vertex including two sides defining an angle, the angle ranging from 105 degrees to 120 degrees, the bevel configured to form an interference fit between the vertex and a bottom of the receiving channel and having a height between the peripheral edge and where the two sides intersect ranging from 0.28 mm to 1 mm;

wherein at least a portion of the vertex contacts the bottom of the receiving channel, is in compression, and is deformed once the plastic lens is fitted in the eyeglass frame.

12. The eyeglass component of claim 7, wherein the receiving channel bottom comprises the intersection of the opposed interior wall surfaces.

* * * * *